US008166319B2

(12) United States Patent
Svensson et al.

(10) Patent No.: US 8,166,319 B2
(45) Date of Patent: Apr. 24, 2012

(54) METHODS AND SYSTEMS FOR USE-CASE AWARE VOLTAGE SELECTION (75) Inventors: Jim Svensson, Lund (SE); Matthias Kamuf, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 417 days.

(21) Appl. No.: 12/496,879

(22) Filed: Jul. 2, 2009

(65) Prior Publication Data
US 2011/0004775 A1 Jan. 6, 2011

(51) Int. Cl.
G06F 1/32 (2006.01)
(52) U.S. Cl. ......................... 713/320; 713/324
(58) Field of Classification Search ............ 713/320
See application file for complete search history.

(56) References Cited

U.S. PATENT DOCUMENTS

| | | | |
|---|---|---|---|
| 6,535,735 B2 | 3/2003 | Underbrink et al. | |
| 6,795,781 B2 | 9/2004 | Aldridge et al. | |
| 7,205,805 B1 | 4/2007 | Bennett | |
| 7,788,670 B2* | 8/2010 | Bodas et al. | 718/105 |
| 2004/0019815 A1 | 1/2004 | Vyssotski et al. | |
| 2005/0108667 A1* | 5/2005 | Iadanza et al. | 716/4 |
| 2008/0178023 A1 | 7/2008 | Kim et al. | |
| 2008/0189517 A1 | 8/2008 | Singh et al. | |
| 2009/0150893 A1* | 6/2009 | Johnson et al. | 718/104 |
| 2009/0217277 A1* | 8/2009 | Johnson et al. | 718/102 |
| 2010/0185882 A1* | 7/2010 | Arnold et al. | 713/320 |
| 2011/0078469 A1* | 3/2011 | Therien | 713/320 |
| 2011/0145615 A1* | 6/2011 | Rychlik et al. | 713/323 |
| 2011/0173478 A1* | 7/2011 | Li et al. | 713/324 |

FOREIGN PATENT DOCUMENTS

| | | |
|---|---|---|
| WO | 2007045377 A1 | 4/2007 |
| WO | 2007129164 A2 | 11/2007 |

OTHER PUBLICATIONS

Lap-Fai Leung; Chi-Ying Tsui; Wing-Hung Ki; , "Minimizing energy consumption of multiple-processors-core systems with simultaneous task allocation, scheduling and voltage assignment," Design Automation Conference, 2004. Proceedings of the ASP-DAC 2004. Asia and South Pacific , vol., No., pp. 647-652, Jan. 27-30, 2004.*
Ahmad, I.; Ranka, S.; Khan, S.U.; , "Using game theory for scheduling tasks on multi-core processors for simultaneous optimization of performance and energy," Parallel and Distributed Processing, 2008. IPDPS 2008. IEEE International Symposium on , vol., No., pp. 1-6, Apr. 14-18, 2008.*
Lieder, Johannes; "Energy-Efficient Scheduling for Multi-Core Processors"; The University of Karlsruhe; Nov. 18, 2008; all pages.*

(Continued)

Primary Examiner — Ryan Stiglic
(74) Attorney, Agent, or Firm — Potomac Patent Group PLLC (57) ABSTRACT Systems and methods according to these exemplary embodiments provide for optimizing voltage use in digital circuits. This can be obtained by creating situations for digital circuits such that the effective critical path (ECP) can be used such as, for example, the case where a digital circuit includes a plurality of voltage domains powered by individual and possibly different voltage sources. This can then reduce voltage use in digital circuits.

12 Claims, 8 Drawing Sheets

OTHER PUBLICATIONS

Ying Chen; Shao, Z.; Zhuge, Q.; Xue, C.; Bin Xiao; Sha, E.H.-M.; , "Minimizing Energy via Loop Scheduling and DVS for Multi-Core Embedded Systems," Parallel and Distributed Systems, 2005. Proceedings. 11th International Conference on , vol. 2, No., pp. 2-6, Jul. 22-22, 2005.*

International Preliminary Report on Patentability in corresponding PCT Application No. PCT/EP2010/059120 mailed Oct. 18, 2011.
International Search Report in corresponding PCT Application No. PCT/EP2010/059120 mailed Oct. 4, 2010.

* cited by examiner

METHODS AND SYSTEMS FOR USE-CASE AWARE VOLTAGE SELECTION

TECHNICAL FIELD

The present invention relates generally to digital circuits and more specifically to the energy usage of digital circuits.

BACKGROUND

In today's society, electrical and electronic devices are plentiful. For example, televisions, personal computers and cellular phones can be found as common household items in many people's homes. These various electronic appliances use a significant amount of energy. Moreover, many of these devices may be battery-powered (or have battery power options) such that battery life or time between battery charges becomes an important device parameter.

Contemporary digital circuits require power, which is typically delivered by a voltage source, to operate in the desired fashion. It is generally known that, within limits, the maximum speed at which a digital circuit can operate depends on the voltage level, where a higher voltage is required for a higher speed. Consequently, a digital circuit requires a sufficient voltage level to operate correctly at its designed speed or frequency.

For a synchronous circuit to work correctly, the clock frequency $f_{clk}$ must fulfill the following criteria:

$$f_{clk} \leq 1/T_{crit} \qquad (1)$$

where $T_{crit}$ denotes the longest path propagation time between two storage elements. To operate at a higher clock frequency, $T_{crit}$ must be lowered. One way that this can be achieved is by increasing the supply voltage $V_{dd}$. This works because the propagation delay $t_p$ of a basic complementary metal oxide semiconductor (CMOS) gate is related to the supply voltage $V_{dd}$ as shown in Equation (2) below.

$$t_p \propto \frac{V_{dd}}{(V_{dd} - V_{th})^\alpha}, \qquad (2)$$

where $V_{th}$ is the threshold voltage of the given CMOS technology, and $1 \leq \alpha \leq 2$ which is also technology dependent. For an asynchronous digital circuit, no clock is used, and the circuit basically operates at the maximum speed as set by the supply voltage.

One way to fulfill the voltage requirement for a digital circuit is to use a fixed, sufficiently high voltage. However, it is also known that the power P consumed by a digital circuit depends on the supply voltage, where a higher supply voltage leads to higher power consumption as shown by:

$$P = P_{stat} + P_{dyn} \qquad (3)$$

where $P_{stat}$ is proportional to $V_{dd}$, and $P_{dyn}$ is proportional to $V^2_{dd}$. To be power efficient, it is thus desired to use as low of a supply voltage as possible which allows the circuit to still function correctly.

To be able to apply as low a supply voltage as possible, it is useful to know what the voltage needs to be for the circuit to operate. However, the exact relation between supply voltage and the maximum speed of a digital circuit includes partly unknown factors, for example, factors that vary between different physical samples of the same circuit, and factors that vary during use of the circuit due to, e.g., operating temperature. Thus, the lowest overall supply voltage level is usually obtained by some adaptive method during actual use of the circuit.

Various systems and methods have been used to reduce or improve voltage control. For example, such methods include dynamically changing the voltage as a function of the required speed or completely turning off the voltage when the circuit is not in use. Another method relies on the use of a replica of the part of the circuit that limits the speed of the circuit, e.g., the so called "critical path". In principal, this minimum supply voltage for the replica is determined and then used, possibly with some margin, for the whole circuit. However, these various solutions do not use all of the information available at run time to select the lowest possible voltage level for a given required speed for a digital circuit.

Accordingly, systems and methods for determining and then supplying a lowest possible voltage for a given required speed for a circuit are desirable.

SUMMARY

Exemplary embodiments relate to systems and methods for optimizing voltage use in digital circuits. According to exemplary embodiments, it is desirable to create situations for digital circuits such that the effective critical path (ECP) can be used such as, for example, the case where a digital circuit includes a plurality of voltage domains powered by individual and possibly different voltage sources. Advantages according to exemplary embodiments described herein include, for example, reduced voltage use in digital circuits. However, it will be appreciated by those skilled in the art that such advantages are not to be construed as limitations of the present invention except to the extent that they are explicitly recited in one or more of the appended claims.

According to an exemplary embodiment, a method for operating a device having a plurality of voltage domains and a plurality of functional units includes the steps of executing a first set of instructions on a first functional unit having a first voltage domain and executing a second set of instructions on a second functional unit having a second voltage domain, wherein the first voltage domain is different than the second voltage domain. The overall voltage consumed by the device during execution is minimized by partitioning the instructions into the first and second sets of program instructions.

According to another exemplary embodiment, a device includes a first functional unit configured to execute a first set of program instructions, a first voltage supply connected to the first functional unit for supplying a first voltage thereto, a second functional unit configured to execute a second set of program instructions, and a second voltage supply connected to the second functional unit for supplying a second voltage thereto. The first voltage is different than the second voltage. The device also includes a controller for providing the first and second sets of program instructions to the first and second functional units, respectively, and for controlling the first and second voltage supplies to output the first and second voltages, respectively.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

As described in the background, there is a relationship within a digital circuit between supplied voltage and speed of operation of the circuit. According to exemplary embodiments, to determine and use optimal voltage amounts, it is recognized that the critical path of some digital circuits is not fixed, but rather depends upon run-time factors. Prior to discussing exemplary embodiments which exploit this recognition, various terms and phrases used herein will first be described. As used herein, the term "path length" refers to the way in which a part of a digital circuit limits the speed of the circuit. For example, if a first path is more limiting than a second path, the first path is longer than the second path, or equivalently, the second path is shorter than the first path.

A digital circuit may be programmably reconfigurable such that it may contain different paths depending upon the software program that it is executing. As used herein, the longest path over all possible uses and configurations of a digital circuit is termed the "maximum critical path" (MCP). Also, as used herein, a "use-case" denotes a specific scenario in which a digital circuit is configured and used in a restricted way and during which the voltage to the circuit (or to a portion of the circuit) is held constant. A specific use-case has a specific longest path that is called herein the "effective critical path" (ECP), where ECP≦MCP.

According to exemplary embodiments, it is possible to find and define use-cases of sufficient time duration for which the ECP is sufficiently smaller than the MCP which allows the use of the ECP for determining the minimum voltage supplied to the digital circuit during use-cases. For example, consider a digital circuit used for filter operations, wherein the digital circuit can be configured to use either 8-bits or 16-bits of precision. For the 16-bits of precision case, the ECP≈MCP, whereas for the 8-bits of precision case ECP<MCP which could allow for the supply voltage to be lowered. In another example, according to exemplary embodiments, consider the case of a multiple core digital circuit with individual cores that can execute different instructions such as addition (add), subtraction (sub), comparison (cmp) and multiplication (mul). If, for a significant number of the computations, a core executes only additions, then it is likely that ECP<MCP and the supply voltage can again be lowered.

According to exemplary embodiments, it is desirable to adapt to using the ECP rather than the MCP where possible to determine the needed supply voltage so as to use a lower voltage and still maintain proper circuit operation. Additionally, according to exemplary embodiments, it is desirable to identify and adapt to situations for digital circuits where the ECP can be used, such as the case where a digital circuit includes a plurality of voltage domains powered by individual (and possibly different) voltage sources and multiple functional units which can be associated with such different voltage domains. For such cases, inter-domain optimizations may exist.

For example, consider a multi-core digital circuit wherein each core at a certain time instance or over a certain time interval executes different instructions, such as addition and multiplication. In this example, suppose that the multi-core digital circuit has a plurality of voltage domains with each domain having a plurality of cores associated therewith. According to exemplary embodiments, to control and reduce the supply voltage, programs (or parts of programs) with the same or similar ECPs are then executed within the same voltage domain. This concept will now be described in more detail with respect to FIGS. 1 and 2.

Figure 1:
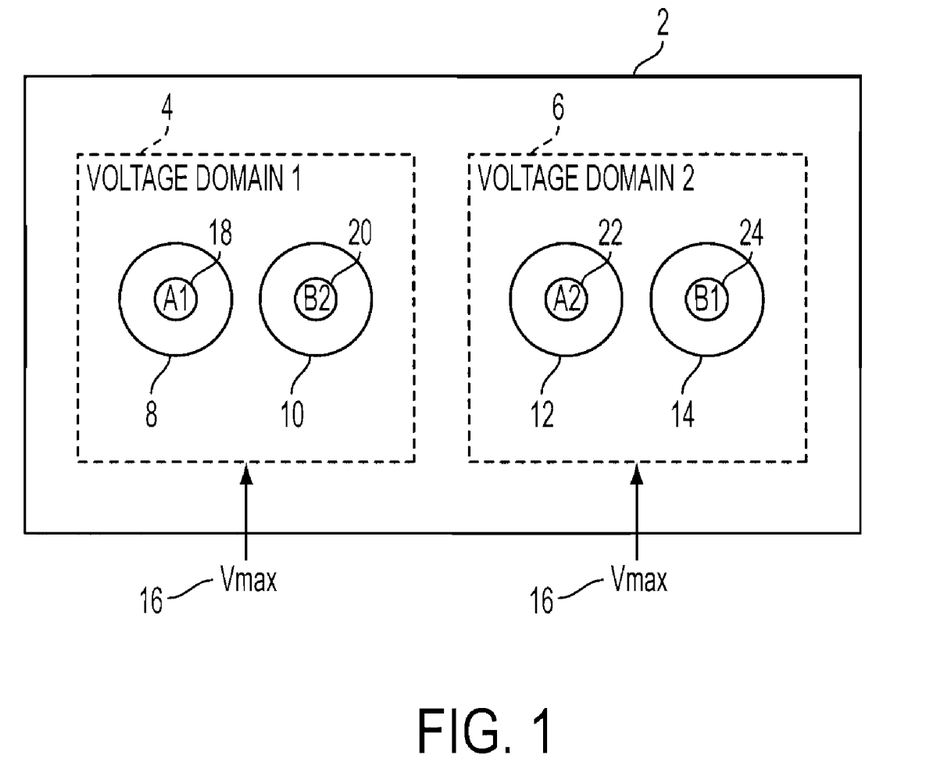
FIG. 1 depicts two voltage domains which use the same voltage.
Figure 2:
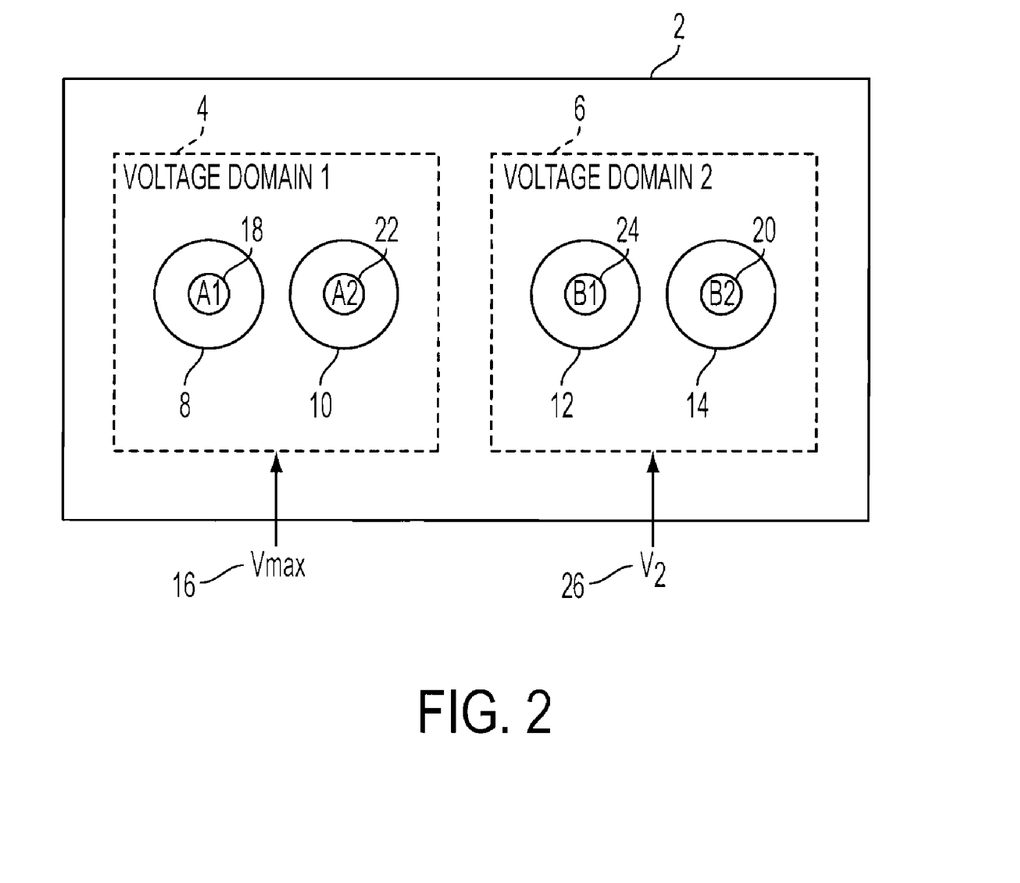
FIG. 2 shows two voltage domains which use different voltages according to exemplary embodiments.

According to exemplary embodiments as shown in FIGS. 1 and 2, a digital circuit 2 includes two voltage domains, Voltage Domain1 4 and Voltage Domain2 6. Voltage Domain1 4 includes two processor cores 8 and 10 in this example, where core 8 is currently executing program A1 18 and core 10 is currently executing program B2 20. Voltage Domain 2 6 includes two cores 12 and 14 in this example, where core 12 is currently executing program A2 22 and core 14 is currently executing program A1 24. Programs A1 18 and A2 22 require the voltage Vmax 16 while programs B1 24 and B2 20 require a lower voltage than Vmax 16, however since each Voltage Domain 4 and 6 include a higher voltage program, each Voltage Domain 4 and 6 is operating at voltage Vmax 16. According to exemplary embodiments, programs can instead be partitioned, and then executed, in a voltage domain which is selected to optimize overall voltage use of a digital circuit as is shown in FIG. 2.

Thus, according to the exemplary embodiments in FIG. 2, the programs 18, 20, 22 and 24 have been moved from their respective voltage domain associations shown in FIG. 1 to different cores 8, 10, 12 and 14 such that overall voltage consumption is optimized. More specifically, cores 8 and 10 in Voltage Domain 1 4 are now executing programs A1 18 and A2 22, respectively. Therefore, Voltage Domain 1 4 is operating at Vmax 16. Cores 12 and 14 in Voltage Domain 2 6 are now executing programs B1 24 and B2 20, respectively. Since programs B1 24 and B2 20 only require a voltage V2 26, which is lower than Vmax 16, Voltage Domain2 6 can operate at the lower voltage V2 to optimize overall voltage usage for the digital circuit 2.

Figure 3:
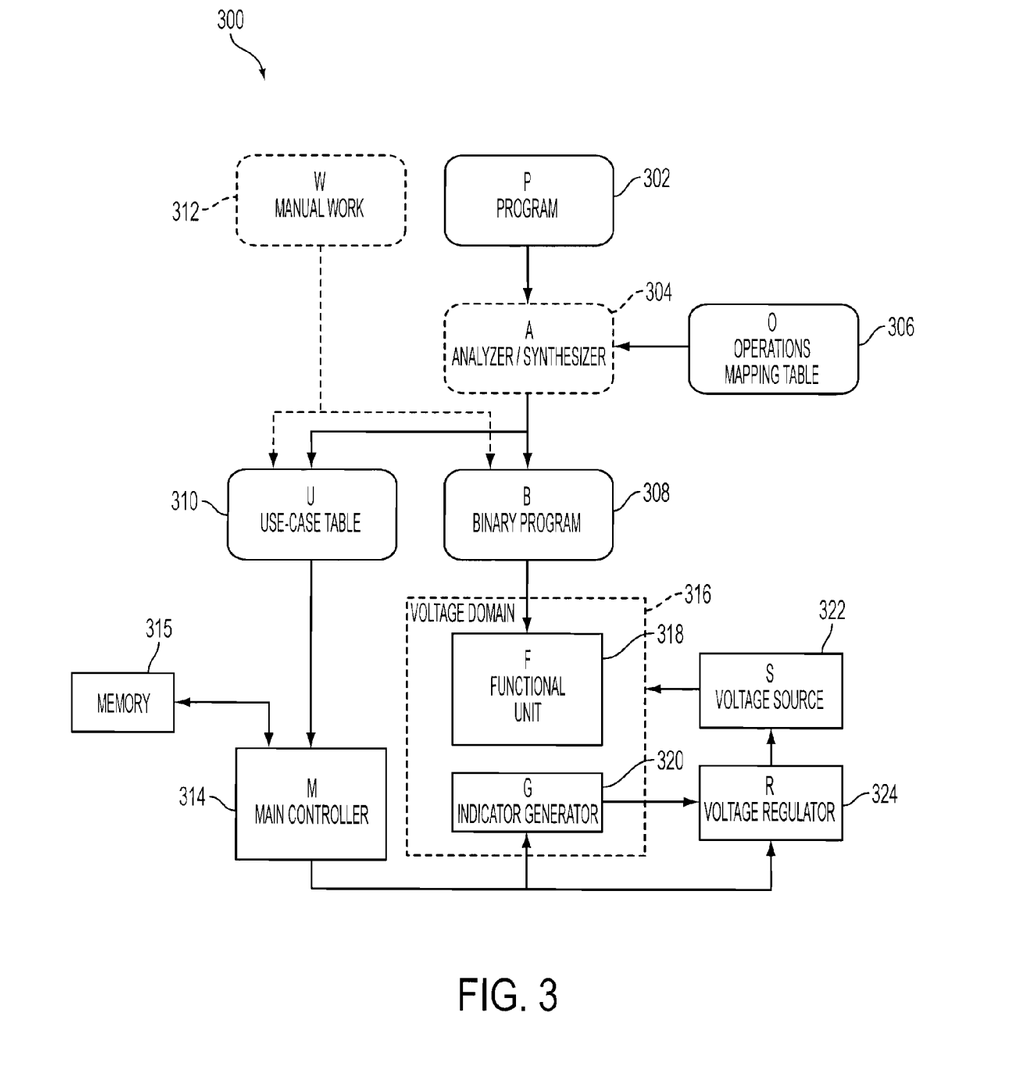
FIG. 3 illustrates hardware and software components for optimizing voltage within a voltage domain according to exemplary embodiments.

According to exemplary embodiments methods, devices and systems are provided which identify and partition use-cases of sufficient time duration for which the ECP is sufficiently smaller than the MCP such that using the ECP for determining the minimum supply voltage to one or more voltage domains associated with a digital circuit will benefit overall voltage consumption for the circuit. An exemplary system within which this can be implemented is shown in FIG. 3, with the square boxes therein denoting hardware elements and the rounded boxes representing software entities. However those skilled in the art will appreciate that the exemplary system of FIG. 3 is purely illustrative and other hardware/software configurations are possible.

According to exemplary embodiments, a program P 302 is written to control a functional unit F 318 located within a voltage domain 316 of device or circuit 300. The program P 302 may be written, for example, in a high level language such as C, in a low level language such as Assembly, consist of a series of configurations, be an intermediate representation resulting from partial compilation of a source program, and the like. Irrelevant of the format of program P 302, program P 302 may control a sequence of operations to be executed by function unit F 318 which can, for example, be a microprocessor or microprocessor core. Additionally, apart from the normal language constructs, the program P 302 may also contain user annotations which can be used to manually partition the program P 302 into use-cases to assist in voltage optimization according to these exemplary embodiments.

According to exemplary embodiments, the Operations Mapping Table O 306 enables program operations and use-cases to be mapped to indicator sets. In general, the ECP of a use-case does not depend only upon the specific set of operations being executed but also upon other things, e.g., the bit accuracy of the operations being performed as described above. For each individual use-case there is therefore a tradeoff regarding how much detail to include in the Operations Mapping Table O 306. For example, use-cases with more, different parameters potentially provides for voltage adaptation which is closer to the ECP, with the trade off of requiring more complex information to be provided and/or processed to achieve that adaptation. Two non-limiting exemplary characteristics of use-cases which may be used in the Operations Mapping Table O 306 are shown below in Table 1, however other characteristics may also be used and further examples are given below.

TABLE 1

| Factor Number | Description |
|---|---|
| 0 | The type of operations and which part of the circuit it uses. (For example, is the multiplier function used or not used.) |
| 1 | Semi-static configuration of the circuit. (For example, is the adder configured for 8-bit operation or for 16-bit operation.) |

Thus Operations Mapping Table O 306 maps each operation for each configuration to an indicator set and an associated weight, examples of which are provided below in Tables 4 and 5. According to some exemplary embodiments, the weight indicates the relative voltage requirement for that indicator set, where a higher weight requires a higher voltage.

The program P 302 can be processed by a program Analyzer/Synthesizer A 304 which generates a binary program B 308 that specifies a sequence of operations to be executed by Functional Unit F 318, and Use-case table U 310. One type of input to the Analyzer/Synthesizer A 304 is performance constraints. The performance constraints can include latency and throughput information/constraints. These performance constraints can vary between different executions of the same program P 302. According to an exemplary embodiment, the Analyzer/Synthesizer A 304 performs functions similarly to a compiler and/or an assembler. According to another exemplary embodiment, the Analyzer/Synthesizer A 304 also analyzes the program P 302 with respect to the Operations Mapping Table O 306. In this case, the Analyzer/Synthesizer A 304 uses one of the user annotated use-cases in program P 302, automatically determines use-cases, or interactively is guided by a programmer to divide the program into use-cases.

For each use-case determined, the Analyzer/Synthesizer A 304 according to this exemplary embodiment performs the following steps: (1) determines the operations for that use-case; (2) finds the weights from Operations Mapping Table O 306; (3) determines the operation with the highest weight; and (4) finds the indicator set for the operation with the highest weight. Additionally, the Analyzer/Synthesizer A 304 analyzes all use-cases in program P 302 and saves, for each use-case, its respective indicator set in Use-case Table U 310. The Use-case Table U 310 includes information about the use-cases in program P 302 and for each use-case the associated indicator set.

According to one exemplary embodiment some of the steps described above may be performed manually. For example, manual work block W 312 represents the exemplary case where the Analyzer/Synthesizer A 304 is not used, but instead such functions are performed manually. In this case known, worst constraints are used, or alternatively, a same program is optimized for a fixed set of constraints and a different set of binary code is generated and selected at run-time. Additionally, when manual work block W 312, e.g., manual analysis, is performed instead of using the Analyzer/Synthesizer A 304, both the Use-case Table U 310 and the binary program B 308 may be constructed manually.

According to exemplary embodiments, the Main Controller M 314 manages the change(s) to adapt the supplied voltage for each use-case and uses information stored in the Use-case Table U 310 to perform this function. Before each use-case in program P 302 is run, to optimize the amount of voltage to be used, the Main Controller M 314 performs, for example, the following tasks: (1) find and retrieve the indicator set for the upcoming use-case; (2) configure the Indicator Generator G 320; (3) initialize the Voltage Regulator R 324; and (4) allow the program to be executed when the voltage is stable by sending an enable signal to the Functional Unit F 318 once the assumed worst case settle time of the Voltage Regulator R 324 and Voltage Source S 322 has elapsed. Alternatively, according to an exemplary embodiment, the program can be allowed to execute when the Voltage Regulator R 324 with the Voltage Source S 322 transmit a lock signal which acts as an enable for the Functional Unit F 318. According to another alternative exemplary embodiment, for cases when the settle time is known, the voltage can be ramped up in advance when going to a higher voltage and ramped down after commencing execution of a program with a lower voltage requirement while ensuring that the voltage does not undershoot the minimum voltage requirement. Additionally, the Main Controller M 314 may store in a memory 315 the selected voltage for each use-case.

According to exemplary embodiments, the Functional Unit F 318 is located in a Voltage Domain 316. Functional Unit F 318 may be a programmable or configurable digital circuit such as a whole or part of a processor, or a whole or a part of an accelerator. The Functional Unit F 318 executes a sequence of operations as specified by the binary program B 308 which it receives. Additionally, for a given use-case, the Functional Unit F 318 requires some lowest voltage to be supplied to it for correct operation.

According to exemplary embodiments, the Indicator Generator G 320 is a voltage sensitive device that may be part of the same chip as the Functional Unit F 318. Indicator Generator G 320 is programmable which results in its ability to choose between a plurality of configurations. For each configuration Indicator Generator G 320 provides a set of indicators that gives an indication of the relative level of applied voltage from the Voltage Source S 322. According to a purely illustrative example, each indicator set can be a binary indicator, e.g., a zero or a one, and an indicator set can include two indicators, where the first indicator indicates if the voltage is a little more than required and the second indicator indicates if the voltage is somewhat more than required, i.e., the second indicator indicates a higher voltage amount than the first indicator which enables the regulation of the voltage to be within a small and safe region above the minimum required voltage. Alternatively, each indicator can still be binary with the indicator set including one indicator, where the indicator indicates if the voltage is sufficient for correct operation of the use-case or if the voltage is not sufficient for correct operation of the use-case. According to an exemplary embodiment, instead of using an Indicator Generator G 320, a table can be provided which includes the indicators for the different voltages.

Figure 4:
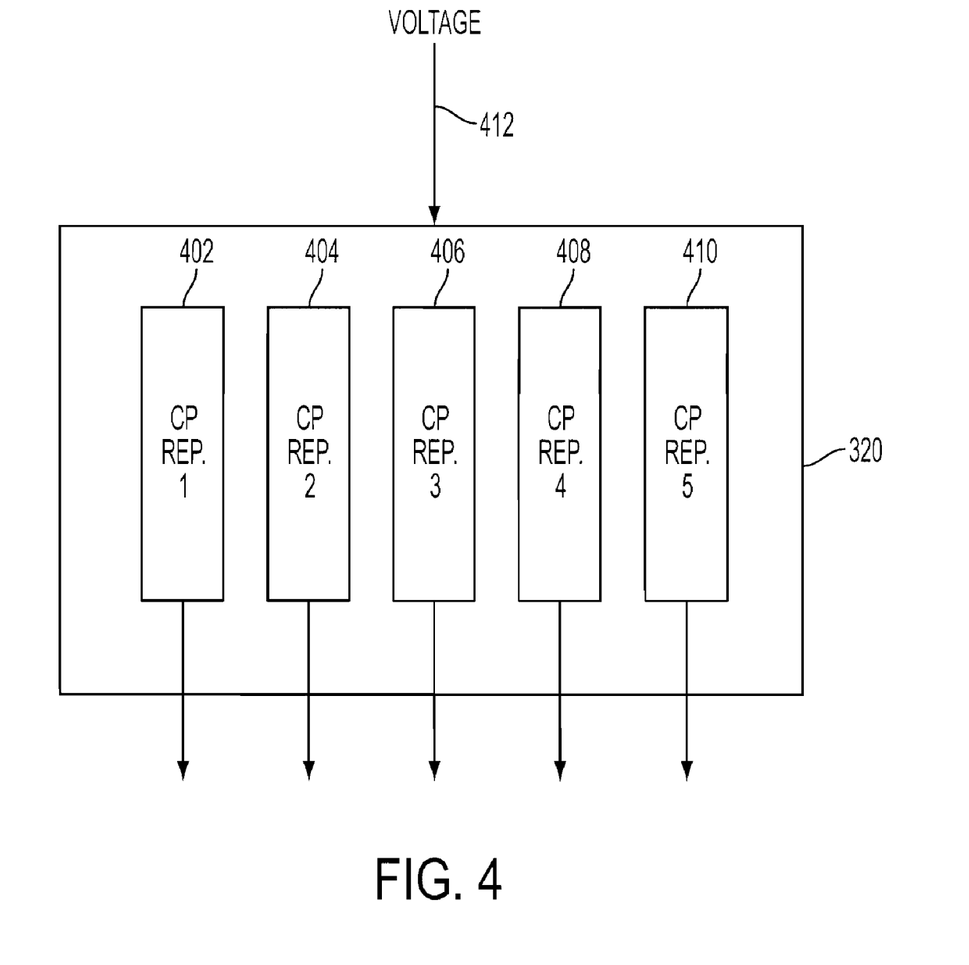
FIG. 4 depicts an indicator generator according to exemplary embodiments.

According to one exemplary embodiment, a configurable device 300 may have a plurality of separate replicas of critical paths for different independent parts of the Functional Unit F 318. Each configuration which is selectable by the indicator generator G 320 is then associated with one of the replicas. According to another exemplary embodiment, the configurable device 300 may have one or more configurable critical paths which allow the capture of more detail. Each configuration of the Indicator Generator G 320 then selects a specific replica and a specific configuration of that replica. According to exemplary embodiments, one purely illustrative embodiment of an Indicator Generator 320 is shown in FIG. 4. FIG. 4 shows an Indicator Generator G 320 which includes five, optionally configurable, critical path replicas 402, 404, 406, 408 and 410. Voltage 412 from the Main Controller M 314 is received by the Indicator Generator 320 and, based upon this received voltage 412, one or more of the critical path replica 402, 404, 406, 408 and 410 can provide an output, e.g., the output can be an indicator of a one if the voltage is high enough or a zero if the voltage is too low.

According to exemplary embodiments, the system shown in FIG. 3 additionally includes a Voltage Regulator R 324 and a Voltage Source S 322. The Voltage Regulator R 324 interprets the indicators from the Indicator Generator G 320 and control information from the Main Controller M 314 and then implements a control algorithm to control the voltage which is supplied to the digital circuit by providing control signals to the Voltage Source S 322. The Voltage Source S 322 provides a stable voltage to the Voltage Domain 316 and is controllable by the Voltage Regulator R 324 either absolutely, e.g., set to a fixed voltage such as 1.32 Volts, or relatively, e.g., the voltage amount can increase or decrease by quantums specified in the control signals from the Voltage Regulator R 324.

Figure 5:
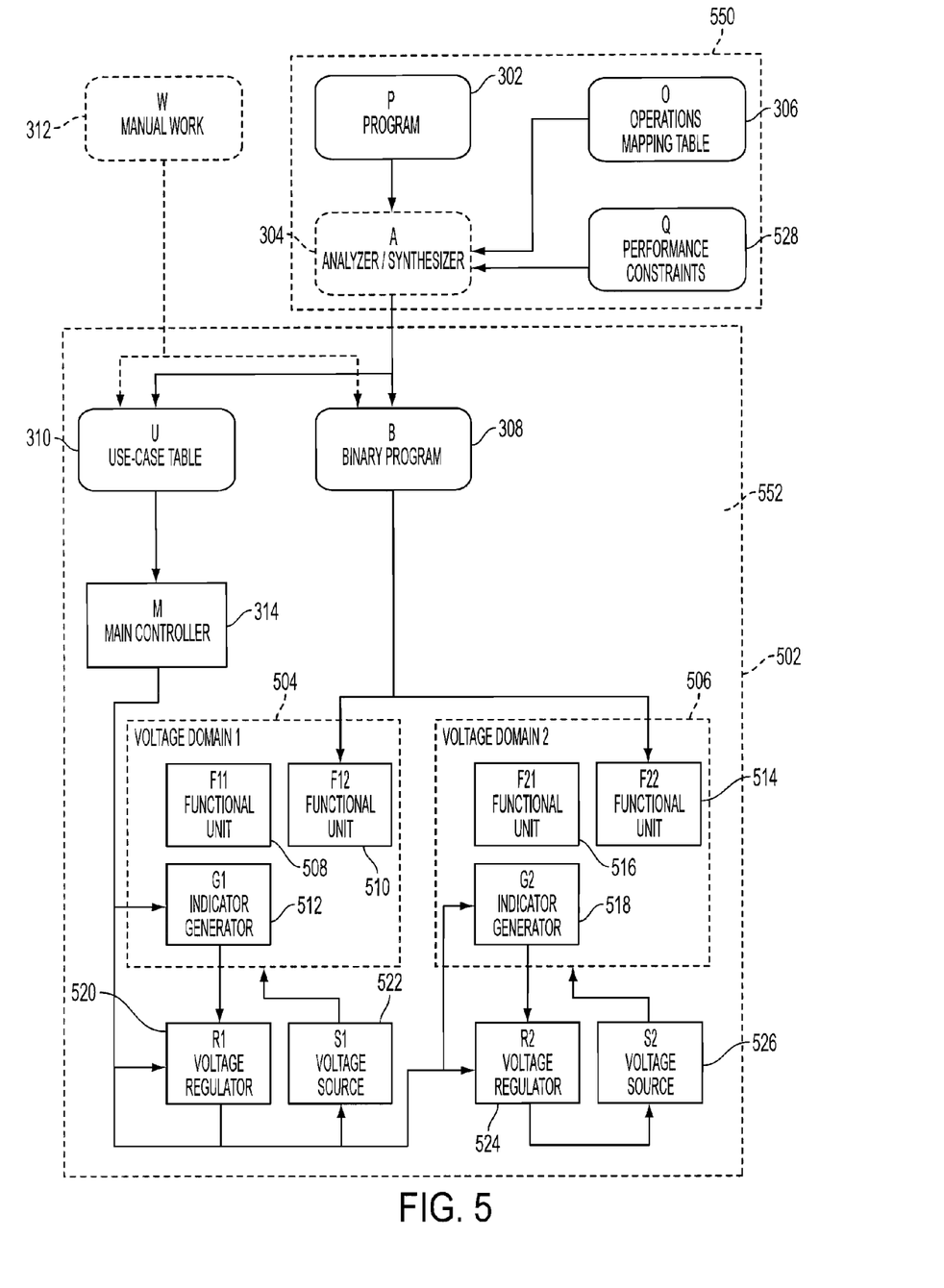
FIG. 5 shows hardware and software components for optimizing voltage within two voltage domains according to exemplary embodiments.

According to exemplary embodiments, energy savings can also be achieved when several different voltage domains exist. For example, consider a circuit where there are a plurality of voltage domains with different voltages, and also in each voltage domain there are a plurality of functional units. Each individual Functional Unit F 318 can execute individual binary programs B 308 (or portions of a program, e.g., subroutines) that originate from the same source program. Such an exemplary embodiment is illustrated in FIG. 5. While FIG. 5 shows only two voltage domains 504, 506 each with two functional units 508, 510 and 514, 516, respectively, it will be appreciated by those skilled in the art that any number of voltage domains and functional units are possible. Additionally, FIG. 5 builds upon the functions described with respect to FIG. 3 above. Thus for those elements in FIG. 5 which have the same reference number as corresponding elements in FIG. 3, reference is made to the description above for those elements.

According to this exemplary embodiment, when there are several functional units available for execution of operations specified by the binary program 308, then the Analyzer/Synthesizer A 304 schedules the operations for execution on the Functional Units 508, 510, 514 and 516 as shown in FIG. 5. The Analyzer/Synthesizer A 304 may choose different schedules with different performance properties, such as throughput or latency, i.e., Performance Constraints Q 528. Analyzer/Synthesizer A 304 also uses information from Operations Mapping Table O 306 and the known structures of the Voltage Domains 504, 506 to optimize partitioning of operations in different Voltage Domains 504, 506 with respect to energy usage, for example using energy optimization techniques described below. The optimal partitioning is not necessarily frequency dependent but instead depends on the properties of the program.

Turning now to a discussion of how the partitioning may be performed consider that, according to exemplary embodiments, the maximum frequency for a critical path in a functional unit depends on the supply voltage $V_{dd}$ as shown in Equation (4):

$$f_{max}(V_{dd}) = \kappa (V_{dd} - V_{th})^\alpha / V_{dd}, \qquad (4)$$

where $\alpha$ and the threshold voltage $V_{th}$ are CMOS technology dependent, and $\kappa$ is fixed for a specific critical path. Equivalently, the minimum voltage for a given frequency is shown in Equation (5):

$$V_{min}(f) = \beta h(f), \qquad (5)$$

where $\beta>0$ is given by the specific critical path, and $h(f)>0$ is independent of the specific path but instead depends upon the above described constants.

Continuing with this example, assume that there are N operations in total to execute for a particular binary program 308. Associated with each operation there is a critical path and a capacitance for executing that operation. The energy for executing all N operations is shown below in Equation (6):

$$E_{tot} = \sum_{n=0}^{N-1} V_n^2 C_n, \qquad (6)$$

where $V_n$ is the voltage used for operation n, and $C_n$ is the capacitance associated with executing operation n. Assuming, without loss of generality and solely for the sake of this illustrative embodiment, that the operations are sorted such that the operation with the lowest voltage requirement is the first operation and the operation with the highest voltage requirement is the last operation, then the minimum voltage requirement for each operation n is shown in Equation (7):

$$V_{min,n}(f) = \beta_n h(f), \qquad (7)$$

where $V_{min,n'} \geq V_{min,n}$ for n'>n.

Figure 6:
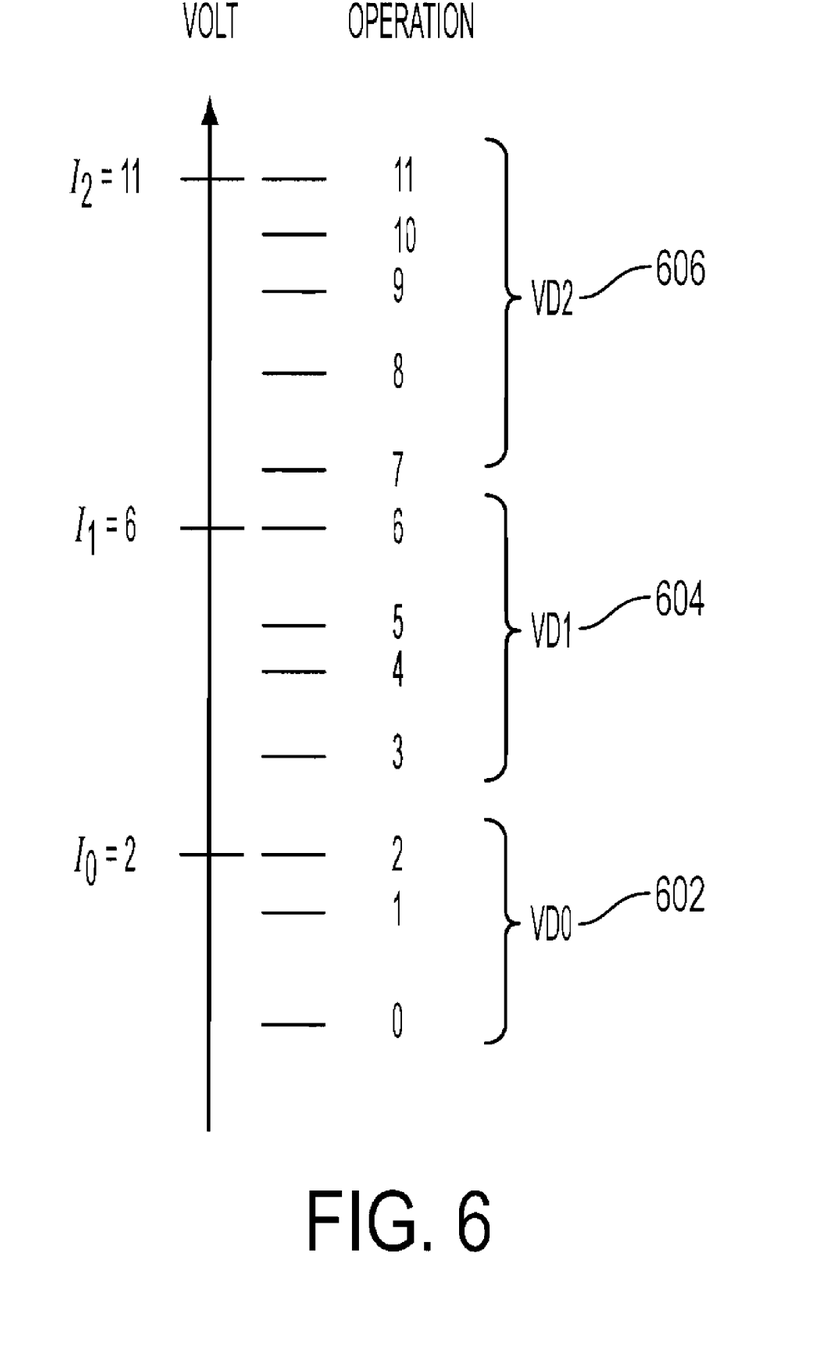
FIG. 6 illustrates voltage partitioning according to exemplary embodiments.

According to exemplary embodiments, if there are K voltage domains, then a partitioning of the operations is given by K indices $I_k$, $0 \leq k < K$. Voltage domain k is then assigned voltage $V_k = V_{min,Ik}$, and voltage domain k executes all operations n with $I_{k-1} < n \leq I_k$, that is, each operation is assigned to the domain with the lowest possible voltage (operation(s) $n \leq I_0$ is assigned to voltage domain 0). To account for the operation with the highest voltage requirement, one may set $I_{K-1} = N-1$. An example of a partitioning result using such techniques is shown graphically in FIG. 6, where according to exemplary embodiments, there is a partitioning of N=12 operations, for a device having K=3 voltage domains. The partitioning, in this purely illustrative example, is specified by the indices $I_k = \{2, 6, 11\}$. The assignments used here are as follows: $0 \leq n \leq I_0 = 2$ in voltage domain 0 (VD0) 602; operations $I_0 < n \leq I_1 = 6$ in VD1 604; and operations $I_1 = 6 < n \leq I_2$ in VD2 606.

According to exemplary embodiments, the energy for execution of all operations using this allocation of operations to specific voltage domains is then given as shown below in Equation 8:

$$E_{tot} = \sum_{k=0}^{K-1} \sum_{n=0}^{N_k-1} V_n^2 C_{l_k-n}, \quad (8)$$

$$= \sum_k V_k^2 \sum_n C_{l_k-n}$$

$$= \sum_k (\beta_{l_k} h(f))^2 \sum_n C_{l_k-n}$$

$$= h^2(f) \sum_k \beta_{l_k}^2 \sum_n C_{l_k-n}.$$

From this, the partitioning that minimizes energy is represented by Equation (9).

$$= \sum_k \beta_{l_k}^2 \sum_n C_{l_k-n} \quad (9)$$

Equation (9) minimizes the energy for all frequencies. It is thus sufficient for the Analyzer/Synthesizer A 304 to save the indicator sets for the operations corresponding to the operation with the highest voltage requirement in each partition.

Returning now to FIG. 5, according to other exemplary embodiments Operations Mapping Table O 528 may thus also include extended characteristic information, e.g., capacitance information, to facilitate partition calculation as described above, an example of which is shown below in Table 2.

TABLE 2

| | |
|---|---|
| 0 | Capacitance for operations using, for example, multiplier, adder or comparator functions |
| 1 | Capacitance for different semi-static configurations of the circuit. For example, capacitance when using accumulator when it is configured for rounding or truncation. |
| 2 | Capacitance for the dynamic use of the digital circuit. For example, capacitance when multiplier used only for 8-bit multiplications, or also for 16-bit multiplications. |

To better enable the reader to understand how the partitioning of programs according to these exemplary embodiments may be performed, a specific example which uses the afore-described partitioning techniques will now be discussed. However it should be recognized that this example is intended to be purely illustrative, rather than limiting, of the present invention. Thus, according to an exemplary embodiment, suppose that a particular program P 302 is generated for operation within a digital circuit (such as that illustrated in FIG. 5) as shown in Table 3.

TABLE 3

| |
|---|
| add |
| sub |
| mul |
| cmp |

An Operations Mapping Table O 306 is then generated based on this program P 302. While Operations Mapping Table O 306 may be generated as a single table, or in any desired data storage format, it is shown below as two tables, Table 4 and Table 5 associated with different semi-static configurations, respectively, for clarity of the discussion.

TABLE 4

(Semi-static configuration 1)

| operation | indicator(s) | weight (β) | capacitance (C) |
|---|---|---|---|
| add | 1 | 5 | 2 |
| sub | 1 | 5 | 2 |
| cmp | 1, 2 | 6 | 2 |
| mul | 1, 3 | 10 | 32 |

TABLE 5

(Semi-static configuration 2)

| operation | indicator(s) | weight (β) | capacitance (C) |
|---|---|---|---|
| add | 1 | 7 | 2 |
| sub | 1 | 7 | 2 |
| cmp | 1, 2 | 6 | 2 |
| mul | 1, 3 | 20 | 32 |

The Analyzer/Synthesizer A 304 analyzes the program P 302 and selects which of the two the semi-static configurations of the digital circuit are appropriate for execution of all (or a portion of) the program P 302. As described above, digital circuits may have different semi-static configurations in which they can operate, e.g., bit resolutions, which may effect voltage consumption and for which, therefore, Operations Mapping Table 306 may have different data entries associated therewith. In this example, suppose that the Analyzer/Synthesizer A 304 determines, in this purely illustrative example, that it is semi-static configuration 1 as shown in Table 4 is to be used. The Analyzer/Synthesizer A 304 then, for each instruction in the program P 302, obtains the corresponding parameters from the Operations Mapping Table O 306 and then determines a partition that minimizes the total energy needed relative to the Performance Constraints Q 528, e.g., in the manner described above. According to exemplary embodiments, Performance Constraints Q 528 include constraint information such as latency and throughput information. Output from the Analyzer/Synthesizer A 304 includes the binary program B 308 and the Use-case table 310.

While voltage optimization is typically not performed solely by the Analyzer/Synthesizer A 304 according to this exemplary embodiment, for further understanding of such embodiments, assume that the operations (add, sub and cmp) are assigned to Voltage Domain 1 504 and that the operation (mul) is assigned to Voltage Domain 2 506. For each domain Analyzer/Synthesizer A 304 also finds the operation with the highest weight and the corresponding indicators. For Voltage Domain 1 504 the weight is six, given by cmp as found in Table 3, and the indicators are (1, 2). In Voltage Domain 2 506 the weight is 10, given by mul, and the indicators are (1, 3). During run-time, in this example, the Main Controller M 314 configures Voltage Domain 1 504 to use the indicators (1, 2) during program execution and it configures Voltage Domain 2 506 to use indicators (1, 3) during execution.

It will be appreciated by those skilled in the art that devices which implement these exemplary embodiments may, but need not, have all of the elements illustrated in FIG. 3 or FIG. 5. For example, some elements and their corresponding functions could be located at manufacturing facilities/performed during manufacturing of the end use devices, e.g., those elements in block 550, whereas other elements/functions, e.g., those in block 552, could be disposed in the commercial end use product. Other delineations are also possible. Additionally, various items within product 502, as compared with FIG.

3, have been scaled up. For example, product 502 includes two Voltage Domains 504 and 506, each of which include two functional units F11 508, F12 510, F21 516 and F22 514 respectively. In support of this, each Voltage Domain 504 and 506 has its own Voltage Regulator 520, 524 and Voltage Source 522 and 526. Main Controller M 314 has the ability to configure individual indicator sets for each Voltage Domain 504 and 506 for use. While two Voltage Domains 504 and 506, as well as their supporting components, are shown, product 502 can include more or fewer Voltage Domains and more or fewer associated components, as desired.

According to exemplary embodiments, the above described exemplary embodiments can be employed to optimize voltage, i.e., place and execute instructions in voltage domains such that overall voltage use can be minimized, in devices which use digital circuits. This can reduce overall energy use and, in battery operated devices, extend battery life by reducing charge use. Examples of devices which can use digital circuits include, but are not limited to, cellular phones, devices with processors, and the like.

Figure 7:
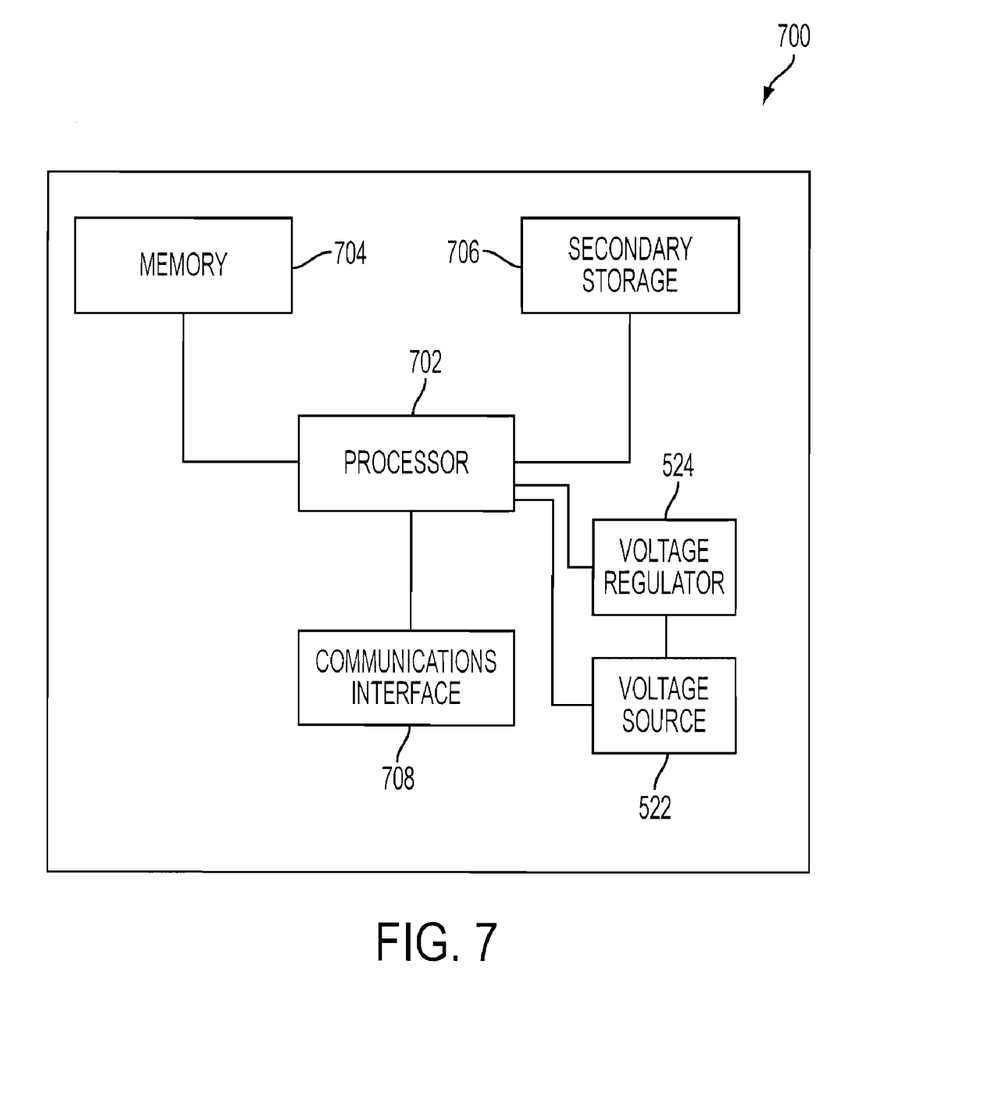
FIG. 7 shows an electronic device according to exemplary embodiments.

The exemplary embodiments described above provide methods and systems for optimizing voltage use in digital circuits. Electronics device 700 can contain a processor 702 (or multiple processor cores), memory 704, one or more secondary storage devices 706, a communications interface 708, one or more voltage source 522 (while not explicitly shown voltage source 522 can supply voltage as needed to any element within electronic device 700) and one or more voltage regulators 520. Processor 702 can include one or more functional units 508 and an indicator generator 512. Additionally, the processor 702 can include a plurality of voltage domains 504 and 506. A portion of the processing capability of the electronic device 700 can perform the function of the Main Controller 314 and memory 704 can store information as desired, e.g., the Use-case table 310, associated voltages, and the like. Accordingly, the exemplary embodiments described above can be executed within electronic device 700, e.g., a cellular phone, to reduce overall voltage usage.

Figure 8:
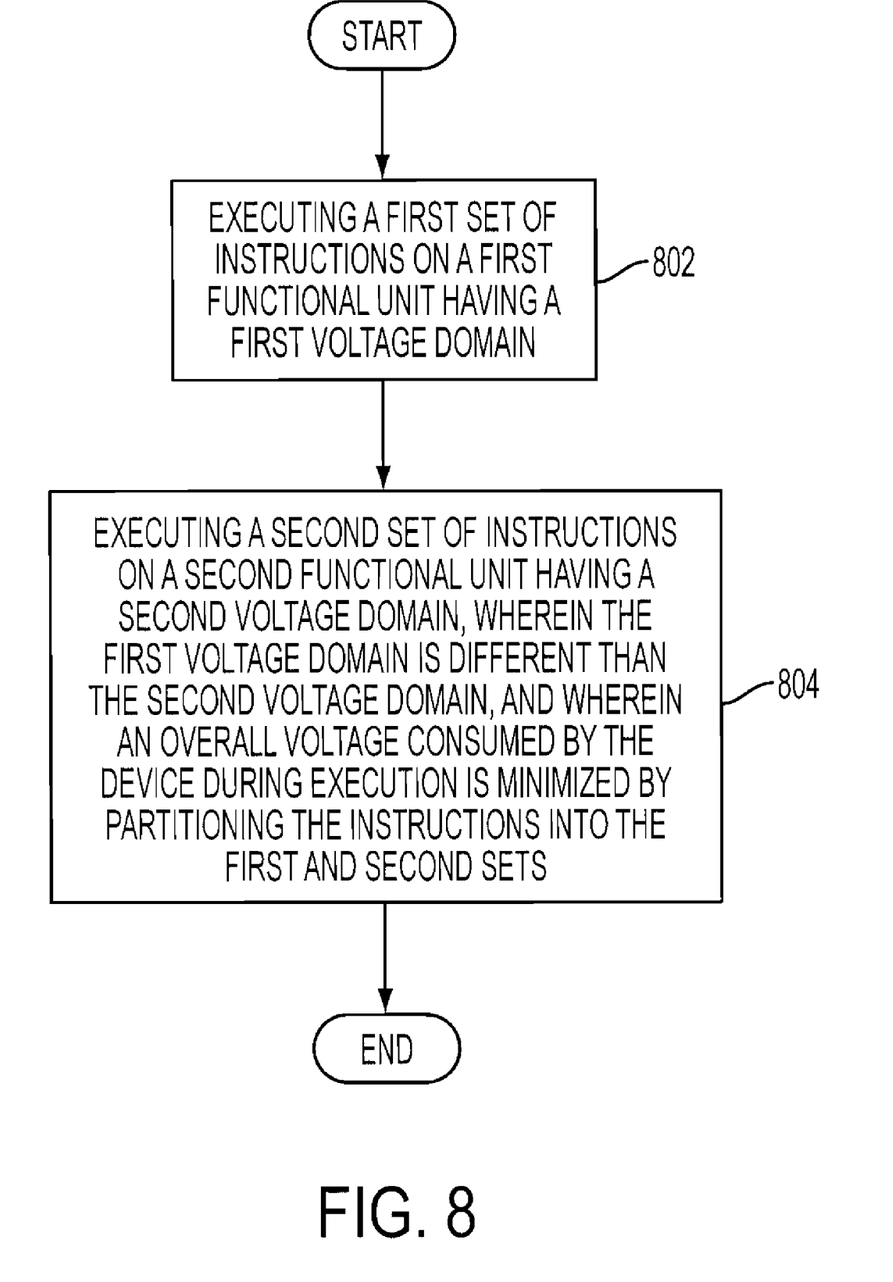
FIG. 8 shows a flowchart illustrating a method according to exemplary embodiments.

Utilizing the above-described exemplary systems according to exemplary embodiments, a method for operating a device is shown in the flowchart of FIG. 8. Initially a method for operating a device having a plurality of voltage domains and a plurality of functional units includes: executing a first set of instructions on a first functional unit having a first voltage domain in step 802; and executing a second set of instructions on a second functional unit having a second voltage domain, wherein said first voltage domain is different than the second voltage domain, and wherein an overall voltage consumed by the device during execution is minimized by partitioning the instructions into the first and second sets in step 804.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. For example, while voltage is described in the exemplary embodiments herein, power and energy consumption which are related to voltage are also reduced through the use of the above described exemplary embodiments. No element, act, or instruction used in the description of the present application should be construed as critical or essential to the invention unless explicitly described as such. Also, as used herein, the article "a" is intended to include one or more items.

The invention claimed is:

1. A method for operating a device having a plurality of voltage domains and a plurality of functional units comprising:
    executing a first set of instructions on a first functional unit having a first voltage domain;
    executing a second set of instructions on a second functional unit having a second voltage domain;
    receiving information including a program, performance constraints and a table, wherein said table includes matched information of operations and indicator sets;
    analyzing said information; and
    outputting said use-case table and said binary program,
    wherein said first voltage domain is different than said second voltage domain, and
    wherein an overall energy consumed by said device during execution is minimized by partitioning said instructions into said first and second sets.

2. The method of claim 1, further comprising:
    storing a use-case table associated with a binary program which has been partitioned into said first and second sets of instructions;
    retrieving an indicator set for a use-case for each voltage domain from said use-case table;
    configuring an indicator generator for each voltage domain based said indicator set for said use-case for each voltage domain, wherein each configuration of said indicator generator for each voltage domain is associated with a path in said device to optimize voltage used within each voltage domain; and
    initializing a voltage regulator associated with each voltage domain prior to executing said first and second sets of instructions on said first and second sets of functional units, respectively.

3. The method of claim 2, wherein said program includes at least one command.

4. The method of claim 3, wherein said command includes at least one of addition, subtraction and multiplication.

5. The method of claim 1, wherein said performance constraints include at least one of latency information and throughput information.

6. The method of claim 1, wherein said step of analyzing said information further comprises:
    determining operations for each use-case;
    retrieving weights from said table;
    determining an operation with a highest weight; and
    finding an indicator set for said operation with said highest weight.

7. A device comprising:
    a first functional unit configured to execute a first set of program instructions;
    a first voltage supply connected to said first functional unit for supplying a first voltage thereto;
    a second functional unit configured to execute a second set of program instructions;
    a second voltage supply connected to said second functional unit for supplying a second voltage thereto, said first voltage being different than said second voltage;
    a controller for providing said first and second sets of program instructions to said first and second functional units, respectively, and for controlling said first and second voltage supplies to output said first and second voltages, respectively; and
    an operation mapping table which includes a mapping between each program instruction and a weight which is associated with a voltage needed by said device when said program instruction is executed by said device.

8. The device of claim 7, wherein said first and second functional units are any one of: processors, processor cores and accelerators.

9. The device of claim 7, wherein said controller uses said weights stored in said operation mapping table to partition program instructions into said first and second sets of program instructions in a manner intended to minimize overall energy consumption by said device.

10. The device of claim 7, wherein said operation mapping table further includes indicators which are used to indicate a relative voltage level associated with said program instructions.

11. The device of claim 7, wherein said first set of instructions and said second set of instructions are grouped together based upon their respective voltage requirement characteristics.

12. The device of claim 7, wherein said operation mapping table further includes information associated with a capacitance which is associated with executing said program instructions.

* * * * *